United States Patent [19]
Ruof

[11] 3,776,605
[45] Dec. 4, 1973

[54] ELECTRICALLY CONTROLLED BRAKING SYSTEM

[75] Inventor: Edgar J. Ruof, Akron, Ohio

[73] Assignee: The Goodyear Tire & Rubber Company, Akron, Ohio

[22] Filed: Oct. 18, 1971

[21] Appl. No.: 189,832

Related U.S. Application Data

[63] Continuation of Ser. No. 877,794, Nov. 18, 1969, abandoned.

[52] U.S. Cl.................. 303/21 A, 244/111, 303/20
[51] Int. Cl............................................... B60t 8/00
[58] Field of Search........................... 188/3 R, 181; 244/111; 303/7, 20, 21; 318/656, 657

[56] References Cited
UNITED STATES PATENTS

| | | | |
|---|---|---|---|
| 2,473,038 | 6/1949 | Rockwell | 303/20 X |
| 3,350,142 | 10/1967 | Schuman | 303/20 X |
| 3,382,012 | 5/1968 | Lucien | 303/21 P |
| 3,507,542 | 4/1970 | Cannella | 188/3 R X |
| 3,535,004 | 10/1970 | Howard et al. | 303/21 EB |
| 3,609,313 | 9/1971 | Lucien | 303/21 A X |

Primary Examiner—Milton Buchler
Assistant Examiner—Stephen G. Kunin
Attorney—F. W. Brunner et al.

[57] ABSTRACT

The invention relates to an improved means of braking and providing anti-skid control for vehicles by utilizing electronics between the brake pedal and the electro-hydraulic valve which serves the dual function of braking and anti-skid control. The anti-skid signal comes from normal anti-skid circuits. The brake pedal is manually controlled, and it operates against the spring force to develop an electrical signal directly proportional to the actuation. The signal produced by the anti-skid circuits is inversely proportional to the degree of skid of the wheels. The two signals are compared and the lower of the two is selected and drives the electro-hydraulic valve to control the hydraulic pressure to the brake.

5 Claims, 1 Drawing Figure

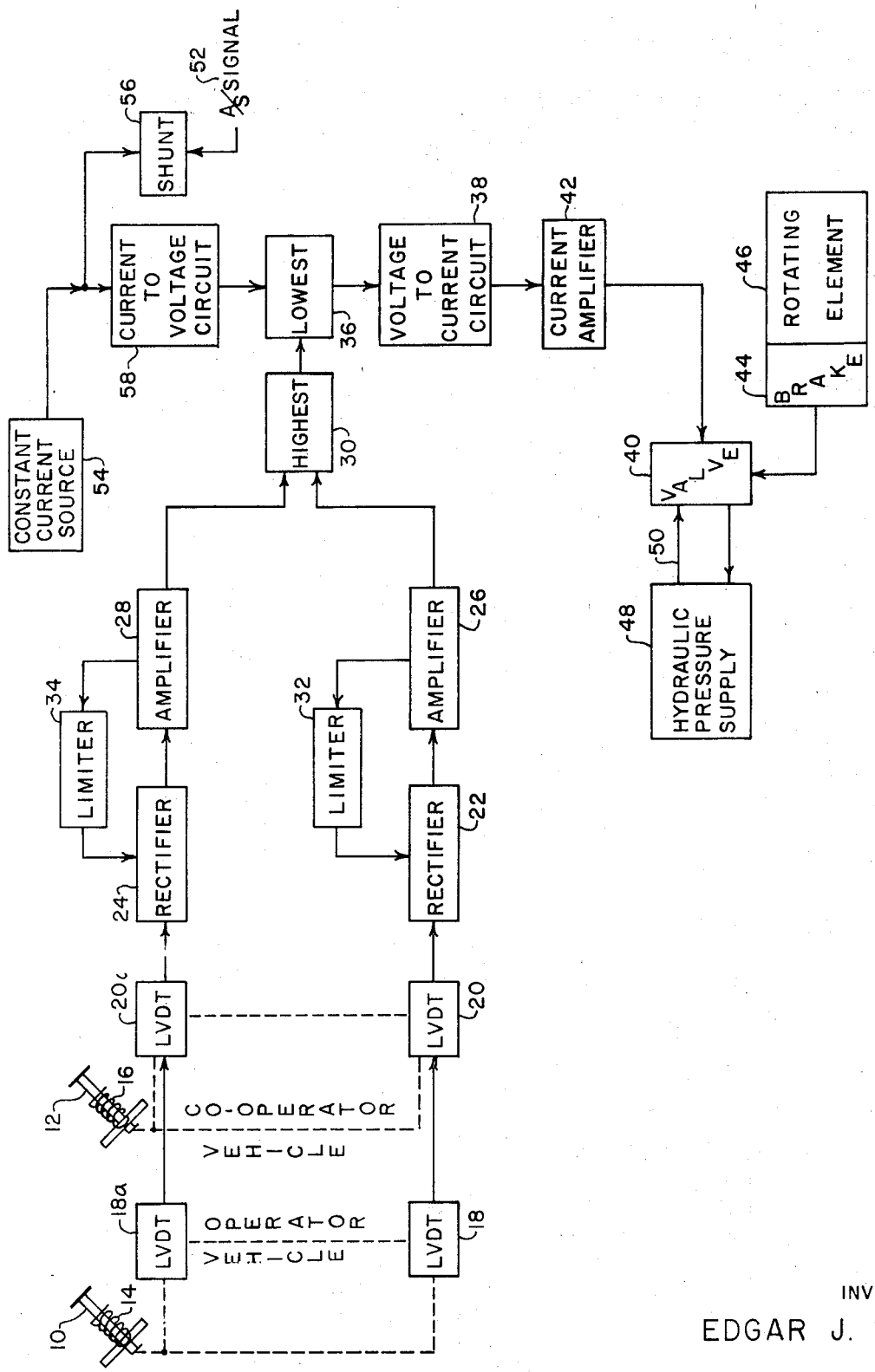

ELECTRICALLY CONTROLLED BRAKING SYSTEM

This is a continuation of application Ser. No. 877,794, filed Nov. 18, 1969, now abandoned.

Heretofore it has been known that there have been many and various types of braking systems with those most preferred on vehicles being hydraulically actuated and controlled systems. There have been attempts to incorporate electrical actuation into a hydraulic braking system, but these attempts have been relatively expensive, difficult to produce and somewhat insensitive upon actuation, as they do not give the operator thereof a proper feel for the amount of braking that is being applied.

The general object of the present invention is to meet the needs of the art by providing an electro-hydraulic braking system that is extremely reliable, highly sensitive, and relatively inexpensive, that is primarily intended for use in vehicle brakes.

A further object of the invention is to provide an electro-hydraulic braking system that can conveniently cooperate with an anti-skid system for electro-hydraulic control of vehicle brakes.

The aforesaid objects of the invention and other objects which will become apparent as the description proceeds are achieved in a system to provide electrical actuating power to a brake for a rotating object which comprises a manually controlled spring loaded brake pedal, means to produce an electrical anti-skid signal having an amplitude inversely proportional to the amount of skidding of the rotating object, means to compare the amplitudes of the two electrical signals and produce an output equal to the lower of the two signals, and valve means driven by the signal to control energization of the brake.

For better understanding of the invention reference should be had to the accompanying Drawing which is a block diagram schematic showing the system components arranged to achieve the preferred embodiment of the invention.

Referring to the embodiment of the invention illustrated in the drawing, the numerals 10 and 12 indicate brake pedals which might be operated by a vehicle operator and co-operator, respectively where a two system operator control might be desired. However, a single operating brake pedal certainly will meet the objects of the invention where this type of system is preferred. In any event each of the pedals, 10 and 12, is spring loaded as by springs 14 and 16, respectively so that manual actuation of the pedal gives the same type of feel that actuation of a pedal in a completely hydraulic system has given in the past. Any suitable mechanism to achieve this proper feel of the foot or hand of the vehicle operator and co-operator will meet the objects of the invention. The springs are merely shown as one convenient structure to accomplish the desired results.

Each of the pedals, 10 and 12, actuates a respective pair of linear-variable differential transformers labeled LVDT and identified by numerals 18–18a and 20–20a, respectively. The LVDT's provide AC signals of an amplitude directly propertional to the manual force of the actuation for the respective brake pedals 10 and 12. The AC voltages are rectified in respective rectifiers 22 and 24, amplified in amplifiers 26 and 28 and then fed to a circuit 30 that rejects the lower of the signals and transmits only the highest. While the preferred embodiment of the invention provides that the signals from the brake pedals are created by LVDT's, many other types of transducers could be used, such as potentiometers and strain gauges. Furthermore, the signal need not be AC, but an appropriate DC signal could also be generated.

Both the vehicle operator and vehicle co-operator actually actuate two LVDT's 18 and 18a and 20 and 20a as they actuate their brake pedals. Two are provided for safety purposes and therefore the two resulting signals are identical on any given pedal. Specifically, the signals from LVDT's 18 and 18a from pedal 10 should be identical. Likewise, the signal from LVDT's 20 and 20a from pedal 12 should be identical. It should be stressed, however, that the use of the two LVDT's for each pedal is not necessary to achieve the objects of the invention, but comprises the preferred embodiment of the invention for safety reasons.

The electrical signals from the vehicle operators and co-operators LVDT's 18 and 20, and 18a and 20a are electrically in series and therefore additive so that, for example, a 30 percent force on the operator's pedal 10 and 20 percent force by the co-operator's pedal 12 will provide 50 percent of full power to the brakes. Limiters 32 and 34 from the amplifiers 26 and 28 to the rectifiers 22 and 24 causes the output of the amplifiers 26 and 28 to be limited to 100 percent of full brakes whenever the sum of the respective LVDT's 18 and 20 or 18a and 20a exceeds 100 percent.

Normally, the two signals from the amplifiers 26 and 28 are identical because the signals from the respective LVDT's 18 and 20, and 18a and 20a are identical. However, in the event of a failure of either, the other would continue to provide a normal braking signal. This is true because the circuit 30 transmits only the highest of the two amplifier voltages.

The signal from circuit 30 is fed to a circuit 36 that rejects the higher of the two signals fed thereto and sends on only the lower signal. The second of the two inputs to the circuit 36 is a modified anti-skid signal. This will be more fully defined hereinafter. The output from circuit 36 is sent to a voltage to current circuit 38 which provides a current that is directly proportional to the voltage from circuit 36. It is an important feature of the invention that the valve 40 is current controlled rather than voltage controlled. This means that changes in the resistance in the valve coil have no effect on the performance of the valve. The current is amplified in a conventional current amplifier 42. The pressure from the valve 40 is directly proportional to the current in the coil of the valve and this is the pressure that is sent to the brake 44 for control of rotating element 46. The valve 40 is any of the conventional type that electrically controls hydraulic pressure from a supply source 48, through line 50 to valve 40, and to the brake 44, with return to the supply or sump 48.

An anti-skid signal 52 comes from any normal and conventional anti-skid circuits and is the usual manner, any increase in the anti-skid signals calls for decreased brake pressure. However, in this case the signal is not compatable with the valve 40, because increased valve signal causes increased brake pressure and, hence more skidding. Therefore, additional circuitry is required to change the anti-skid signal so that it decreases rather than increases, and yet remains a linear function of the signal from the anti-skid system. This is done by a constant current source 54, and shunt circuit 56, and a current-to-voltage circuit 58.

With no anti-skid signal 52, there is no shunting action by the shunt 56. The current from the constant current source 54 then causes maximum voltage to be developed by the current-to-voltage circuit 58. This could provide a maximum signal to the valve and maximum brake pressure, but it does not ordinarily do so because of the circuit 36 that allows only the lowest voltage to be sent to circuit 38, and the lowest voltage is usually the signal from the braking LVDT's.

Whenever the voltage from the braking circuit becomes great enough to cause a skid, the anti-skids system will develop a signal 52 to cause the shunt to divert current from the constant current source 54. The diverted current is directly proportional to the amplitude of the anti-skid signal. Therefore, with maximum anti-skid signal there will be full diversion of current from the current-to-voltage circuit 58. The output of circuit 58 will then be zero and it then will also be recognized as the lowest in circuit 36. It will then be the controlling signal for the valve and will cause the output pressure of the valve 40 to drop to zero.

From the foregoing, it can be seen that the valve 40 is controlled by the braking circuits or transducers 18–20 or 18a–20a until skid conditions are encountered. As long as skid conditions exist the valve is controlled by the anti-skid system consisting of current source 54, shunt 56 and current-to-voltage circuit 58. If the force on pedals 10 and 12 is reduced so as to bring brake pressure below the skid threshold, the valve 40 once again becomes controlled by the braking circuits.

It should be understood that all the components illustrated in the drawings in block diagram form are conventional components or circuits well known to and understood by those skilled in the art. For example, the LVDT's could be those identified as 6234AD2B01XX made by Atcotran. A typical component for circuits 30 and 36 are quite familiar to those in the analog or digital computer field. The constant current source 54 can be achieved by any qualified technician. The current-to-voltage source 58 also is well understood by those skilled in the art. The valve 40 is well known in the art. A typical valve would be one shown in U. S. Pat. No. 3,286,734.

It should also be understood that while the invention has been disclosed as coordinating brake pressure electrically from a manually actuated pedal or the like, with an anti-skid signal to allow override of the braking signal as necessary, it should be understood that the invention is applicable to any braking system cooperating with or without an anti-skid system in the unique manner in which an electrical signal actuates the hydraulic system to control the brake.

While in accordance with the Patent Statutes only the best known embodiment of the invention has been illustrated and described in detail it is to be particularly understood that the invention is not limited thereto or thereby, but that the inventive scope is identified in the appended claims.

What is claimed is:

1. A system to provide electrical actuating power to a brake for a rotating object which comprises:
   a manually controlled, spring loaded brake pedal;
   a linear-variable differential transformer actuated by the brake pedal to produce an AC voltage having an amplitude directly proportional to brake pedal force;
   a rectifier and amplifier to rectify and amplify the AC voltage;
   means to produce an electrical anti-skid signal having an amplitude inversely proportional to the amount of skidding of the rotating object;
   means to compare the amplitudes of the rectified and amplified signal and the anti-skid signal and produce an output signal equal to the lower of the two signals;
   a voltage controlled current source, connected to the last said means, for creating a current directly proportional to the output signal of the last said means; and
   current controlled valve means driven by the current created by the voltage controlled current source to control energization of the brake.

2. A system according to claim 1 which includes a primary transformer for a vehicle operator and a primary transformer for a vehicle co-operator with the transformer for the operator and co-operator being connected in series so such transformers produce additive electrical signals.

3. A system according to claim 2 which includes at least one back-up transformer for each operator and co-operator, each connected in series and acting at the same time and independently of said primary transformers.

4. A system according to claim 4 which includes a limiter feeding back from the amplifier to the rectifier to cause the output of the amplifier to be limited to 100 percent of full braking energization whenever the sum of the series additive transformer signals exceeds 100 percent.

5. A system to provide electrical actuating power to a brake for a rotating object which comprises:
   a manually controlled, spring loaded brake pedal;
   a linear-variable differential transformer actuated by the brake pedal to produce an AC voltage having an amplitude directly proportional to brake pedal force;
   means to rectify and amplify the AC voltage;
   means to limit the amplified signal to a maximum value;
   means to produce an electrical anti-skid signal having an amplitude inversely proportional to the amount of skidding of the rotating object;
   means to compare the amplitudes of the limited rectified and amplified signal and the anti-skid to produce an output signal equal to the lower of the two signals;
   means to produce a current proportional to the output signal; and
   valve means responsive to the current to control the pressure actuation of the brake.

* * * * *